(12) United States Patent
Ratcliff et al.

(10) Patent No.: US 6,681,258 B1
(45) Date of Patent: Jan. 20, 2004

(54) FACILITY FOR RETRIEVING DATA FROM A NETWORK ADAPTER HAVING A SHARED ADDRESS RESOLUTION TABLE

(75) Inventors: Bruce H. Ratcliff, Red Hook, NY (US); Arthur J. Stagg, Raleigh, NC (US); Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 09/584,524

(22) Filed: May 31, 2000

(51) Int. Cl.[7] .............................................. G06F 15/16
(52) U.S. Cl. ...................... 709/245; 709/230
(58) Field of Search .................... 709/245, 201, 709/230, 213; 370/463

(56) References Cited

U.S. PATENT DOCUMENTS

| | | | | |
|---|---|---|---|---|
| 5,740,438 A | * | 4/1998 | Ratcliff et al. ............... | 370/463 |
| 5,862,344 A | * | 1/1999 | Hart ............................ | 709/238 |
| 5,974,049 A | | 10/1999 | Ratcliff et al. ............... | 370/401 |
| 5,987,515 A | | 11/1999 | Ratcliff et al. ............... | 709/224 |
| 5,999,974 A | | 12/1999 | Ratcliff et al. ............... | 709/224 |
| 6,003,080 A | | 12/1999 | Ratcliff et al. ............... | 709/224 |
| 6,006,261 A | | 12/1999 | Ratcliff et al. ............... | 709/224 |
| 6,108,701 A | * | 8/2000 | Davies et al. ................ | 709/224 |
| 6,202,169 B1 | * | 3/2001 | Razzaghe-Ashrafi et al. .. | 714/6 |
| 6,205,148 B1 | * | 3/2001 | Takahashi et al. ........... | 370/401 |
| 6,249,820 B1 | * | 6/2001 | Dobbins et al. ............. | 709/238 |
| 6,330,615 B1 | * | 12/2001 | Gioquindo et al. .......... | 709/236 |
| 6,330,616 B1 | * | 12/2001 | Gioquindo et al. .......... | 709/236 |
| 6,334,154 B1 | * | 12/2001 | Gioquindo et al. .......... | 709/236 |
| 6,351,798 B1 | * | 2/2002 | Aono .......................... | 712/11 |
| 6,507,869 B1 | * | 1/2003 | Franke et al. ................ | 709/224 |
| 6,522,654 B1 | * | 2/2003 | Small .......................... | 370/400 |

OTHER PUBLICATIONS

David Plummer, "An Ethernet Address Resolution Protocol", Network Working Group, RFC 826, 11/82.*

* cited by examiner

*Primary Examiner*—Mehmet B. Geckil
(74) *Attorney, Agent, or Firm*—Floyd A. Gonzalez, Esq.; Kevin P. Radigan, Esq.; Heslin Rothenberg Farley & Mesiti P.C.

(57) ABSTRACT

A facility is provided to allow retrieval of specific parameters by a communications stack (e.g., TCP/IP) of a multi-partitioned processing system from a shared network adapter coupling the processing system to a network. The processing system includes multiple communications stacks, each of which registers internet protocol (IP) addresses with the network adapter in an address resolution table shared by the multiple communications stacks. The facility includes query request and reply commands for selectively retrieving specific data from the shared address resolution table, wherein the specific data can include: local registered IP addresses for a communications stack issuing a query request, network address resolution entries associated with a particular HOME IP address, HOME IP addresses of one or more other communications stacks sharing the network adapter, IP addresses owned by other entities on the network, IP addresses which are in the address cache, as well as other types of data.

40 Claims, 5 Drawing Sheets fig. 1
(PRIOR ART)

ARP BASE TABLE       COLLISION CHAIN fig. 4 fig. 5

FACILITY FOR RETRIEVING DATA FROM A NETWORK ADAPTER HAVING A SHARED ADDRESS RESOLUTION TABLE

CROSS-REFERENCE TO RELATED APPLICATIONS

This application contains subject matter which is related to the subject matter of the following patents and applications, each of which is assigned to the same assignee as this application. Each of the below-listed patents and applications is hereby incorporated herein by reference in its entirety:

"INTERNET PROTOCOL ASSISTS FOR HIGH PERFORMANCE LAN CONNECTIONS," by Ratcliff et al., U.S. Pat. No. 5,999,974, issued Dec. 7, 1999;

"INTERNET PROTOCOL ASSISTS USING MULTI-PATH CHANNEL PROTOCOL," by Ratcliff et al., U.S. Pat. No. 6,003,080, issued Dec. 14, 1999;

"INTERNET PROTOCOL ASSISTS USING MULTI-PATH CHANNEL PROTOCOL," by Ratcliff et al., U.S. Pat. No. 6,006,261, issued Dec. 21, 1999;

"INTERNET PROTOCOL ASSISTS USING MULTI-PATH CHANNEL PROTOCOL," by Ratcliff et al., U.S. Pat. No. 5,987,515, issued Nov. 16, 1999;

"INTERNET PROTOCOL ASSISTS FOR HIGH PERFORMANCE LAN CONNECTIONS," by Ratcliff et al., U.S. Pat. No. 5,974,049, issued Oct. 26, 1999;

"METHOD FOR NETWORK COMMUNICATIONS OF MULTIPLE PARTITIONS EMPLOYING HOST-NETWORK INTERFACE," by Gioquindo et al. U.S. Pat. No. 6,330,615, issued Dec. 11, 2001;

"SYSTEM FOR NETWORK COMMUNICATIONS OF MULTIPLE PARTITIONS EMPLOYING HOST-NETWORK INTERFACE," by Gioquindo et al., U.S. Pat. No. 6,330,616, issued Dec. 11, 2001;

"NETWORK COMMUNICATIONS OF MULTIPLE PARTITIONS EMPLOYING HOST-NETWORK INTERFACE," by Gioquindo et al., U.S. Pat. No. 6,339,154, issued Dec. 25, 2001; and "FACILITY FOR FORWARDING DATA FROM A NETWORK ADAPTER TO A ROUTER PARTITION WITHOUT INTERNET PROTOCOL (IP) PROCESSING," by Ratcliff et al., Ser. No. 09/583,689, co-filed herewith now pending.

TECHNICAL FIELD

The present invention relates in general to network communications of processing systems. The invention relates to techniques for effecting communications between a network and multiple partitions of a data processing system employing a host-network interface. More particularly, the invention relates to a facility for retrieving data from a network adapter having an address resolution table shared by multiple communications stacks coupled to the network adapter. Specific parameters can be selectively retrieved and manipulated by an initiating communications stack.

BACKGROUND OF THE INVENTION

Mainframe class data processing systems have hardware and software facilities that enable partitioning thereof. Such processing systems may be subdivided into multiple partitions whereby a user of a partition, or software executing in a partition, has the impression that the processing system is exclusively used by that application. Each partition has the appearance of being a separate and distinct processing system and may even run its own multi-tasking and multi-user operating systems independent from each other partition. An IBM Enterprise Systems Architecture ("ESA")/390 Mainframe Computer is an example of one such partitionable mainframe class data processing system. Partitioning thereof is described in, for example, various publications by International Business Machines Corporation, including "IBM ESA/390 Principles of Operation", IBM Publication No. SA22-7201-02, December 1994, and in the "IBM Enterprise System/9000 Processor Resource/Systems Manager Planning Guide", IBM Publication No. GA22-7123-11 (April 1994), which are both hereby incorporated herein by reference in their entirety.

Figure 1:
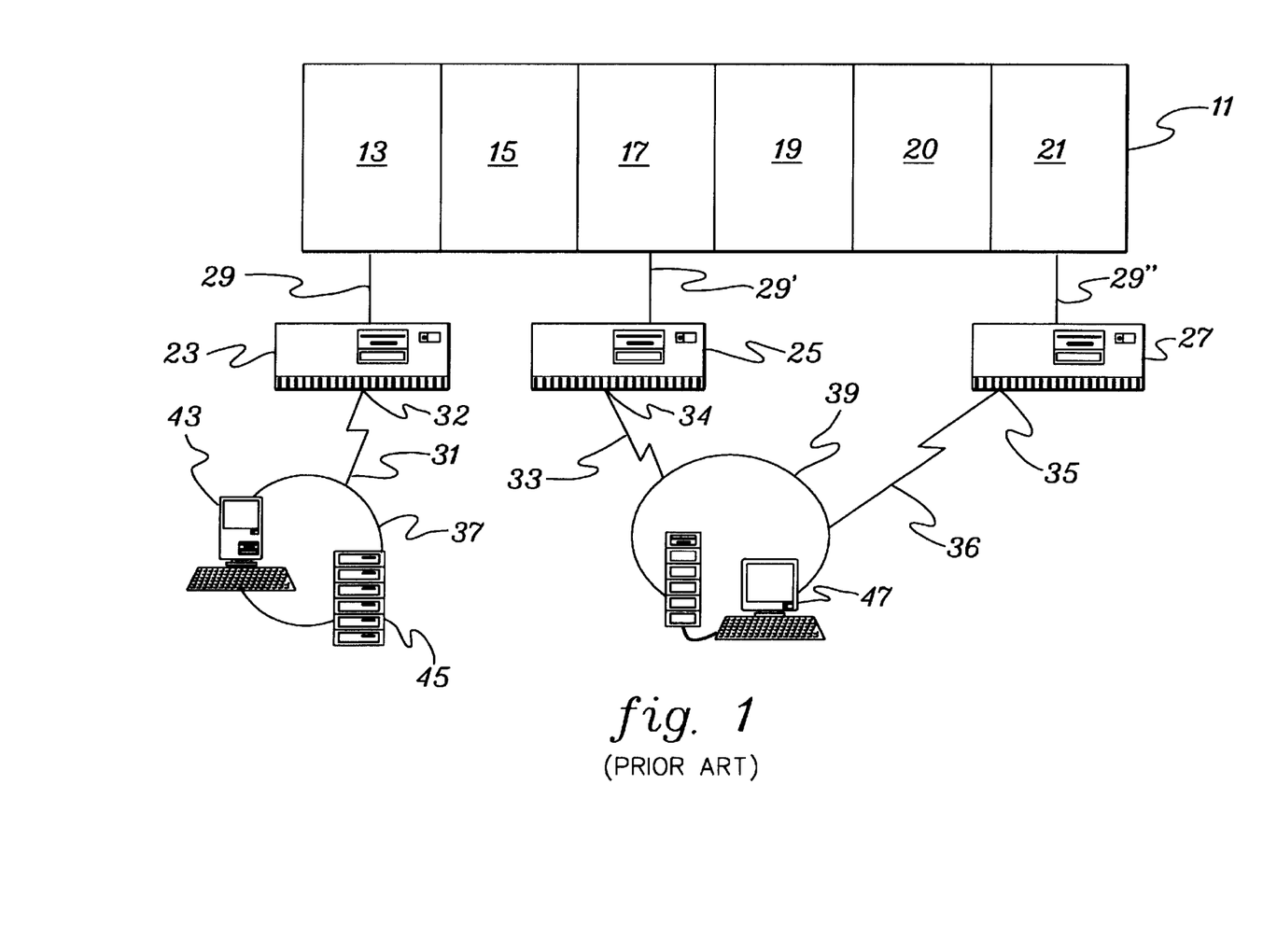
FIG. 1 is a system diagram of a conventional network connected partitionable mainframe class data processing system.

Software executing in individual partitions within the mainframe class data processing system may require a network connection such as a local area network ("LAN") connection or a wide area network ("WAN") connection. This may be used to facilitate connectivity to users, or to application programs used in, for example, a client-server processing environment. Shown in FIG. 1 is a conventional configuration used to connect individual partitions, including the software running therein, to a LAN. The configuration includes a processing system 11 that has partitions 13, 15, 17, 19, 20 and 21.

Network connectivity for each partition of system 11 of FIG. 1 is achieved using separate network interfaces for each partition. For example, partition 13 is conventionally connected through channel connection 29 to an IBM 3172 Interconnect Controller 23 (with 8232 Channel Interface Attachment) that has, for example, a token ring or Ethernet LAN port 32 attached to LAN 37 thereby providing LAN connection 31. Network connectivity is accordingly directly provided between partition 13 and computers 43 and 45 on LAN 37 through the IBM 3172 23. However, according to conventional techniques, this configuration has no other direct logical or physical connections from any of the other partitions to LAN 37. To further note, each application within partition 23 must communicate with a different network port on IBM 3172 23. The IBM 3172 (having internal 8232 Channel Interface Attachment), is described in a publication entitled "8232 LAN Channel Station", Apr. 15, 1998, IBM Publication No. ZZ25-8577-0, that is incorporated herein by reference in its entirety.

The conventional software executing on IBM 3172s restricts direct logical connectivity to being between a single partition and its corresponding LAN. Thus, to facilitate direct connectivity from a computer 47 on a LAN 39 to both partition 17 and 21, multiple IBM 3172s would traditionally be used. Partition 17 is coupled to LAN 35 via channel connection 29'n, IBM 3172 25 and LAN port 34 thereby establishing LAN connection 33. Similarly, partition 21 is coupled to LAN 39 via channel connection 29", IBM 3172 27, and LAN port 35 thereby establishing LAN connection 36.

An enhanced network interface for a mainframe class data processing system having multiple partitions and a port to a network is described in commonly assigned U.S. Pat. No. 5,740,438, which is hereby incorporated herein by reference in its entirety. Briefly summarized, this patent describes establishing a table which defines communications paths between the port to the network and at least two partitions of the multiple partitions. More specifically, each partition has at least one application executing therewithin and the communications paths are defined thereto. Data frames are passed between the network and the applications within the partitions through the port to the network and along the communications paths defined in the table such that the network communications is effected.

Figure 2:
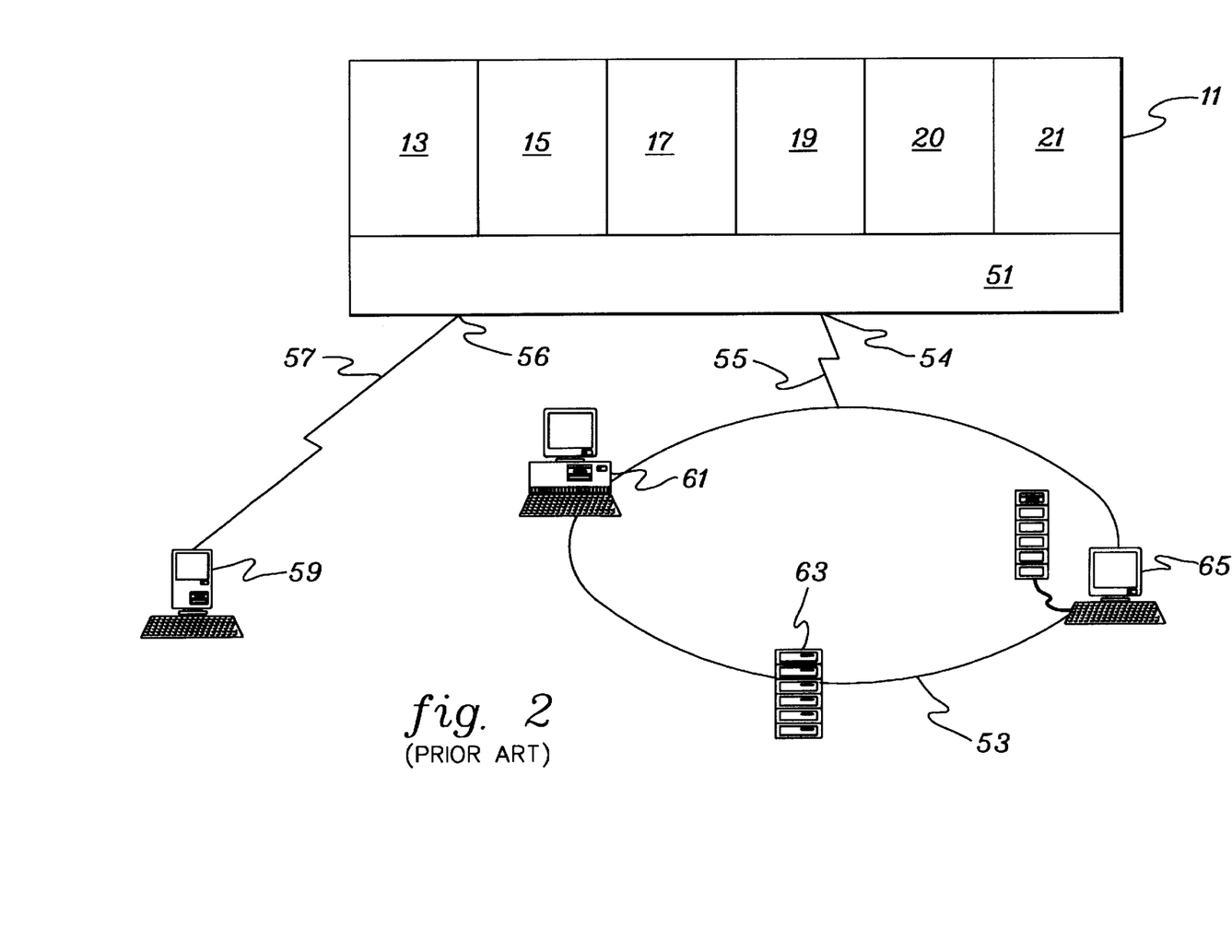
FIG. 2 is a system diagram of an alternate embodiment of a network connected partitionable mainframe class data processing system.

One embodiment of the network interface approach of U.S. Pat. No. 5,740,438 is depicted in FIG. 2. Shown is a partitionable mainframe class data processing system 11 (e.g., an IBM Enterprise System/9000) having an integral host-to-network interface ("HNI") 51 that facilitates a LAN connection 55 from multiple partitions 13, 15, 17, 19, 20 and 21 to LAN 53 through LAN port 54. Each application in each partition may directly communicate with computers 61, 63 and 65 on LAN 53 through the single host-to-network interface 51 and single LAN port 54. The LAN shown is a token ring LAN; however, the system is equally applicable to other types of LANs such as, for example, Ethernet and Fiber Distributed Data Interface ("FDDI"). Further, the host-to-network interface may support multiple network connections by way of multiple network ports. For example, a WAN connection 57 comprising, for example, a Peer-to-Peer Protocol ("PPP") connection may be established to a computer 59 through WAN port 56. Any mix of LAN and WAN connections among multiple ports of host-to-network interface 51 is possible.

The host-to-network connectivity techniques described above have certain limitations, particularly in an Ethernet environment where two different frame types are possible, i.e., Ethernet DIX and Ethernet 802.3. For client/server systems, Transmission Control Protocol (TCP)/Internet Protocol (IP) has become the leading protocol for network communications. Using Ethernet, when a client application running over TCP/IP wants to communicate with a server application, the application must specify one of the two existing Ethernet frame formats. The frame format must also be known by the server machine in order for the TCP/IP connection to be established and any data transfer to occur. Conventionally, in order to make sure that the client and server communicate using the same Ethernet frame formats, both the client and server must specify the specific frame format to be used in their appropriate configuration files. If the configuration files do not match, then the client/server application will not work properly.

The most common server TCP/IP environment today has the complete TCP/IP functionality on one platform. For example, reference "TCP/IP Tutorial and Technical Overview," IBM Document No. GG24-3376-03 (December 1992). In this environment, one device driver exists in each partition for each LAN connection. Each device driver can specify a different Ethernet frame format, but will not support both frame formats. Thus, a different device driver is used for each of the two frame formats. In operation, a dedicated device driver of a partition of the host system takes care of providing both channel headers and media or LAN headers necessary for transmission of an IP packet across the LAN to a client coupled thereto.

With the above as background, the present invention is directed to enhancements to the state-of-the-art of network communications of multiple partitions employing a host-network interface, and in particular, to enhanced techniques for retrieving data from a network adapter having an address resolution table shared by multiple communications stacks of the multi-partition processing system.

DISCLOSURE OF THE INVENTION

Briefly summarized, the present invention comprises in one aspect a method for retrieving data in a communications environment comprising a network and a processing system coupled thereto across a network adapter. The processing system includes multiple communications stacks which communicate with the network across the network adapter. The network adapter has an address resolution table shared by the multiple communications stacks. The method includes: sending a command from a communications stack of the multiple communications stacks to the network adapter to retrieve specific data therefrom; and responsive to the command, extracting the specific data from the shared address resolution table at the network adapter for return to the communications stack sending the command.

Systems and program storage devices corresponding to the above-summarized method are also described and claimed herein.

The ability to integrate and manage heterogenous systems is important as the business world moves stronger into e-business. With today's versions of gateways, the extended capabilities of the present invention increase the overall robustness of the communications network. The ability to dynamically monitor alterations, additions and deletions from the communications functions supported by the host and make necessary modifications in the system to reflect these changes is significant as this "gateway" function is moved into the main system to act like an integrated internet/e-business machine. Further, a facility in accordance with the present invention can operate in conjunction with a variety of systems and be used in a heterogenous environment.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

As noted, a common communications protocol for the mainframe environment today is the Transmission Control Protocol/Internet Protocol (TCP/IP). TCP/IP communications is described in, for example, the above-noted document entitled "TCP/IP Tutorial and Technical Overview," IBM Document No. GG24-3376-03, published December, 1992, which is hereby incorporated herein by reference in its entirety. The present invention can be implemented in a system employing, e.g., TCP/IP communications with certain TCP/IP functionality being migrated from the host system to a second platform, herein referred to as the host-network interface.

Figure 3:
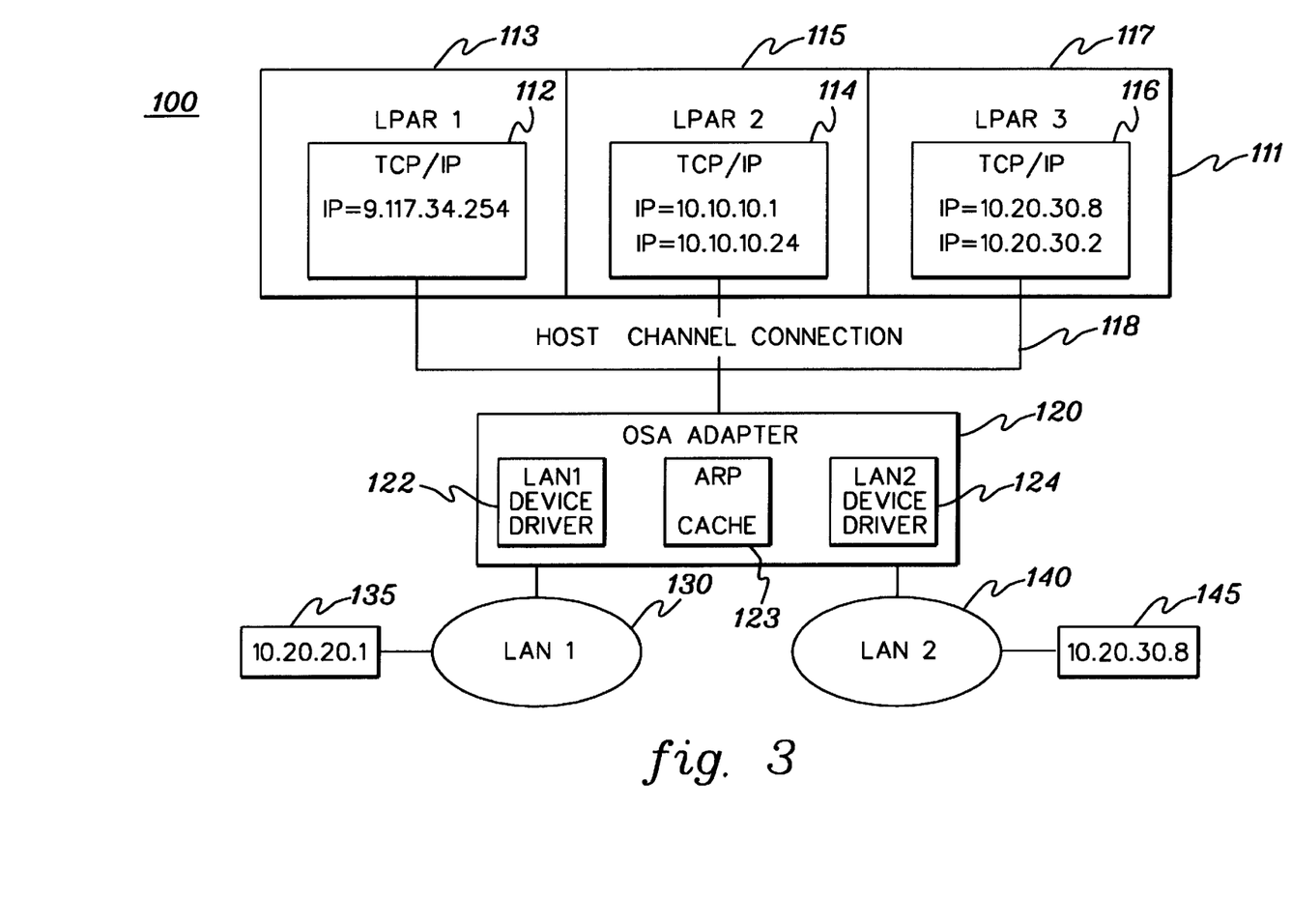
FIG. 3 is a system diagram of one embodiment of a network connected partitionable mainframe class data processing system showing a network adapter (or gateway) to employ facilities in accordance with the present invention.

FIG. 3 depicts one embodiment of a communications network 100 wherein, for instance, an IBM S/390 host system 111 is coupled to multiple local area networks across a host-network interface which comprises a host channel connection 118 and a communications adapter, such as an IBM Open Systems Adapter (OSA) 120. The OSA 120 may be platform channel attached to or integrated with the mainframe environment. In the OSA environment, the TCP/IP address resolution protocol (ARP) function has been migrated to the OSA platform 120.

The OSA adapter has the capability of supporting any number of different TCP/IP connections through a common network device driver, such as LAN 1 device driver 122 and LAN 2 device driver 124. Further, the HOST applications are no longer required to know anything about the LAN or wide area network (WAN) media over which they are communicating.

FIG. 3 shows three separate HOST logical partitions (LPARs) or partitions. As is well known, each LPAR functions as its own separate entity, with each logical partition (LPAR) of the host system 111 being viewed as a completely separate entity. The TCP/IP box within each LPAR defines a unique TCP/IP stack 112, 114, 116, which can function independently of the others. The IP fields are the unique IP addresses defined for each TCP/IP stack. A TCP/IP stack can have one or more IP addresses defined.

Each logical partition LPAR 1 113, LPAR 2 115, LPAR 3 117, couples through a Host Channel Connection 118 to a communications adapter 120, such as IBM's Open Systems Adapter (OSA). The OSA adapter, which has a connection to each of the TCP/IP stacks, is an integrated channel attached LAN adapter which does not contain its own TCP/IP stack. The Host Channel Connection 118 comprises as one example an IBM Enterprise System Connection ("ESCON") channel connector. The LAN device drivers 122, 124 and the Address Resolution Protocol cache 123 are contained in the OSA adapter 120. This is different from other channel attached adapters which do not contain the IP functionality. For background on an Address Resolution Protocol (ARP) cache or table, reference a textbook by W. Richard Stevens entitled TCP/IP Illustrated, published by Addison-Wesley, Volume 1 (1994), the entirety of which is hereby incorporated herein by reference.

Multiple logical partitions are shown in FIG. 3 as sharing a common network device driver 122 or 124 for accessing network 130, 140, respectively, coupled to the host system 111. By way of example, OSA adapter 120 is shown connected to two different LANs, i.e., LAN 1 130 and LAN 2 140. These LANs can be different media types, e.g., Fiber Distributed Data Interface ("FDDI"), token ring, or Ethernet. Further, each LAN 130, 140 includes a representative client platform 135 & 145. The numbers depicted in the client platforms are representative of IP addresses used in accessing the particular platforms.

Media headers are stored in the ARP table (or ARP cache) employed by the communications adapter. (As used herein, a "media header" refers to the MAC (Media Access Control) header, and is also referred to as a LAN header or WAN header.) For example, upon receipt of an ARP response from a client to a broadcast ARP request, the LAN header, which defines the Ethernet frame format of the client machine, is obtained from the response and stored into the ARP table in a manner which will be straightforward to one of ordinary skill in the art. The ARP table will thus contain two headers, one for ARP packets and one for IP packets.

By storing the media header in the ARP table, the OSA adapter can then subsequently append this header to every IP datagram being sent to that particular client platform without having to construct a new media header each time. For Ethernet DIX packets, all the fields in the LAN header are constant, while for Ethernet 802.3, all the fields are constant except for the Frame Length field. This field must be changed to the packet length for each packet transmitted.

Further, media headers can be predetermined by configuring the communications adapter to monitor ARP requests received from the network. Each incoming request will also identify the Ethernet frame type being used by the source client. From such a request, the LAN headers can be obtained and pre-stored in the ARP cache for future use with an IP request destined for that client platform as described above. Advantageously, by so pre-storing the LAN headers, the header does not have to be constructed for each IP datagram being transmitted from the adapter and the host system is freed of any responsibility for designating a client's Ethernet frame format.

Figure 4:
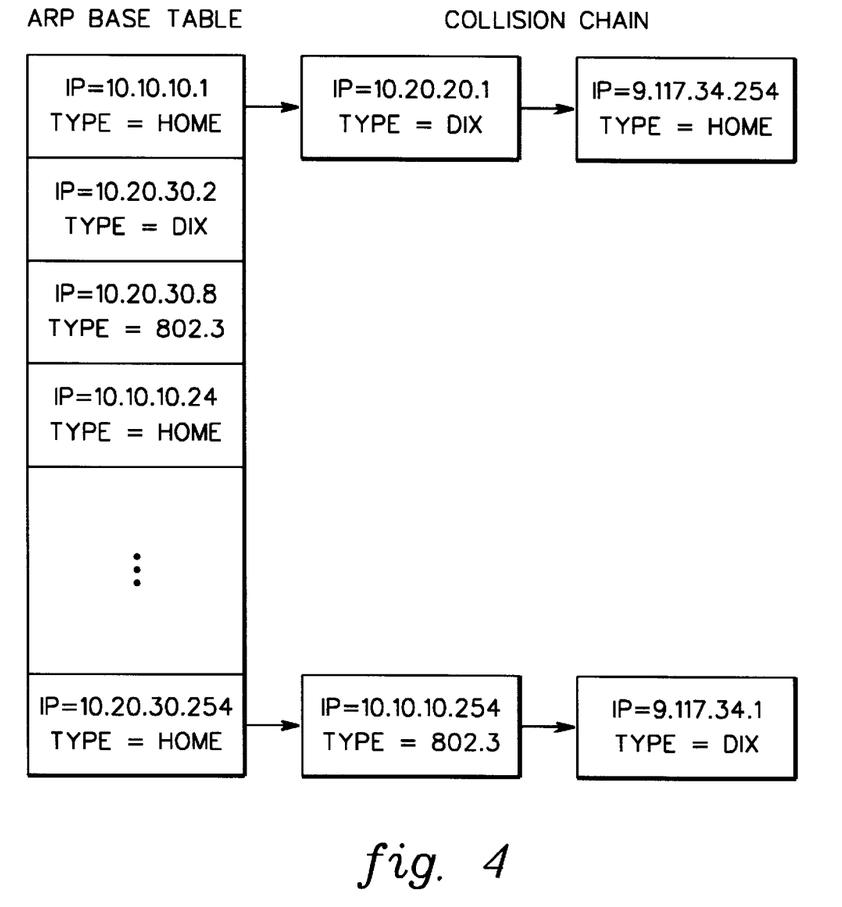
FIG. 4 depicts one embodiment of an address resolution protocol (ARP) cache implemented within a host-network interface such as depicted in FIG. 3.

Another aspect of the gateway device comprises designating and saving "HOME" IP addresses within the communications adapter, e.g., within the ARP cache. FIG. 4 presents an example of the possible formats of the ARP entries on an OSA adapter. The figure depicts two tables, namely, an ARP Base Table and an ARP Collision Chain. To find a proper entry in the OSA ARP table, an IP address is traditionally first hashed to compute a one byte index into the ARP Base Table, which may by way of example comprise 256 bytes. Since it is possible for two IP addresses to "hash" to the same index, the ARP Collision Table is needed to chain these additional entries to the ARP Base Table. The IP numbers in the two tables comprise examples of IP addresses for the application used by the particular networking protocol as will be apparent to one of ordinary skill in the art. The examples agree in part with the IP addresses provided in FIG. 3.

The information in the ARP tables can be obtained from the TCP/IP stacks at initialization time and from the LAN as ARP requests/responses received from the network. At initialization time, each Host TCP/IP stack is configured to register its HOME IP addresses with the OSA adapter in a manner apparent to one skilled in the art. The "HOME" addresses are those which are recognized as local IP addresses by the specific stack. These entities are marked as HOME entries in the ARP cache. The entries are unique from the ARP entries for the LAN because they do not contain the specific LAN frame type which is to be used in transmitting a packet. If needed, the frame format for these entries is dynamically determined as described above by the client or server in the network which sends packets to the OSA adapter.

The HOME IP addresses conventionally mark the IP addresses to which OSA will respond when receiving an ARP request from the LAN. The format of the ARP response which OSA returns is the same as the format of the ARP request which OSA receives. The entire MAC header used to send back an ARP response is thus also saved in the ARP tables on the OSA adapter. This MAC header is then appended to any IP datagrams received from the Host which are destined for the matching IP address.

The HOME entries can serve other purposes. These entries can be used to route packets from a first logical partition (LPAR) to a second LPAR of the host system without going onto a network. When a packet is received from the Host, the destination IP address is "looked up" in the ARP tables of the host-network interface. If an entry is found and it is marked as a HOME entry, then the IP packet is routed directly to the LPAR owning that address. Since the packet is not sent out onto a network, no media or network header needs to be constructed. Further details of this LPAR-to-LPAR communications capability are described in the above-incorporated, commonly assigned United States Patent Applications entitled "Method for Network Communications of Multiple Partitions Employing Host-Network Interface," "System for Network Communications of Multiple Partitions Employing Host-Network Interface," and "Network Communications of Multiple Partitions Employing Host-Network Interface."

To summarize, the present invention builds upon certain proprietary concepts described in the initially-incorporated patents and applications. For example, a method of dynamically providing a host system with information about functions supported by a communications platform provided in a computing network environment is assumed. The computing network environment is also provided with a gateway device (e.g., IBM's OSA adapter) that is electronically connected to at least one initiating host and at least one receiving host, besides the associated communication platform. During an initialization step, functions commercially available on communication platforms are inputted in a special function table. The particular associated platform is queried and the functions provided in the particular computing environment are determined and inputted also into the function table. Alterations and modifications to the availability of old functions or addition of new functions are also monitored and inputted into the table. In this manner, any host connected to the gateway device can obtain a list of all available functions supported by the communication platform at any time and, if desired, a host can choose a function from this list of available functions.

The present invention describes an enhanced function referred to herein as the "query ARP functions". Based on user input, a variety of parameters are retrieved from the gateway, for example, to be manipulated and displayed on an initiating host, i.e., communications stack of a multi-partitioned processing system. These retrieval capabilities allow greater system integration in a communications network comprising a multitude of heterogenous environments, such as found on the Internet.

The query address resolution protocol (ARP) set of functions presented hereinbelow allows a user to retrieve information from a variety of viewpoints using a common set of commands. The ability to perform these functions allows a user to gather and identify information in a central location rather than doing multiple reads/queries and then interpreting the data to obtain a complete system perspective.

Figure 5:
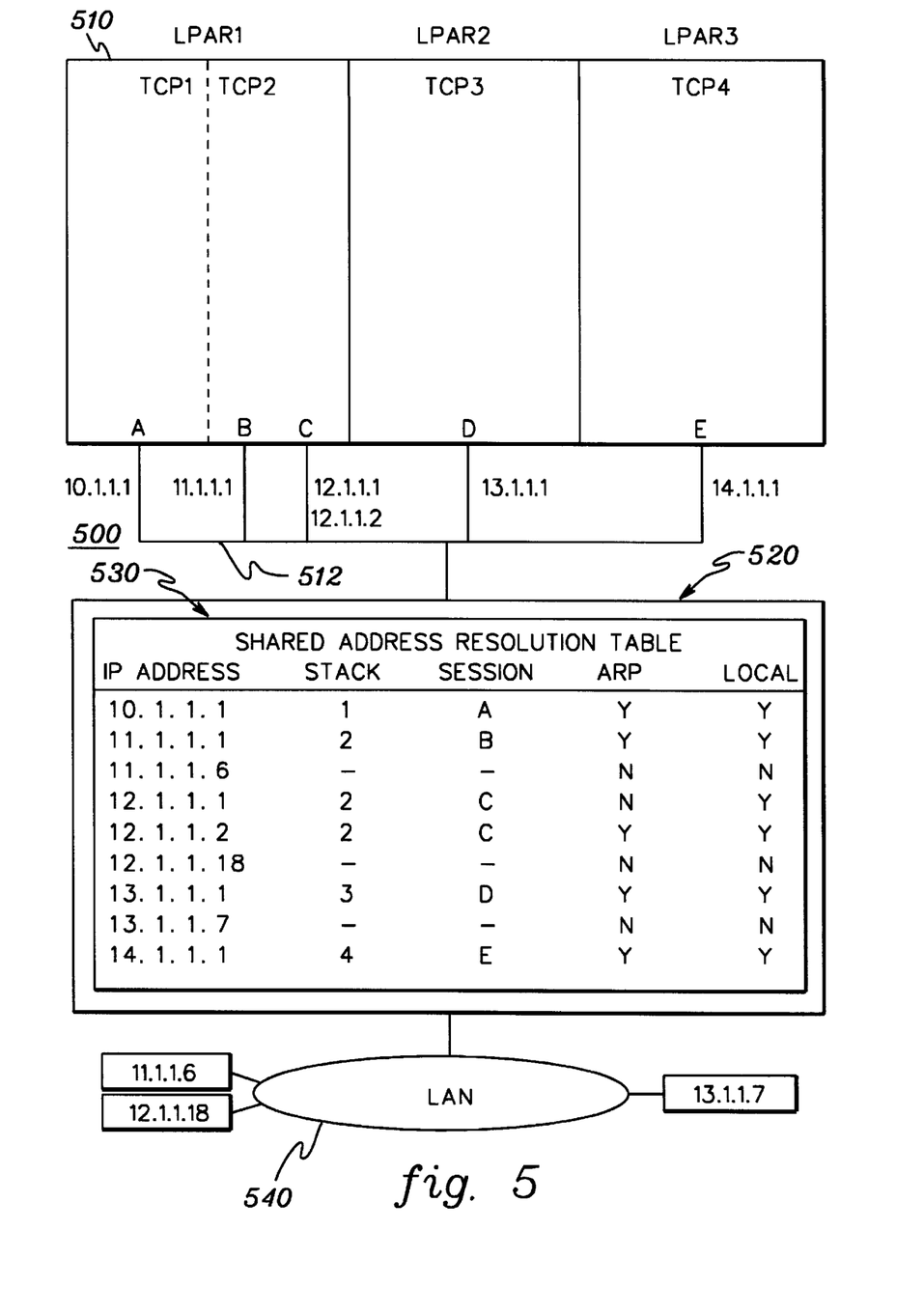
FIG. 5 depicts one embodiment of a system having multiple partitions with multiple communications stacks which communicate across a shared network adapter to a local area network, and which are to employ a data retrieval facility in accordance with the principles of the present invention.

FIG. 5 depicts one embodiment of a communications environment to employ a retrieval facility in accordance with the principles of the present invention. This environment, generally denoted 500, includes a processing system 510 which has multiple partitions, labeled LPAR1, LPAR2 & LPAR3, which are coupled to a network adapter 520 through a host channel connection 512 such as described above. Multiple communications stacks, TCP1, TCP2, TCP3 & TCP4, are executing on the multiple partitions. Note that a single partition can have more than one communications stack (e.g., TCP1 & TCP2 on LPAR1). Each communications stack communicates via a session, labeled A, B, C, D & E in the example of FIG. 5. Note that a communications stack can have one or more sessions with the same network adapter, reference sessions B & C of communications stack TCP2. Also, note that any number of addresses can be defined for a specific session, for example, session C has addresses 12.1.1.1 & 12.1.1.2 defined in this example. Further information on sessions and the addressing thereof is provided in co-pending United States patent application entitled "Communication Method and Apparatus For Use In a Computing Network Environment Having High Performance LAN Connections," now U.S. Pat. No. 6,185,218, the entirety of which is hereby incorporated herein by reference.

In the example of FIG. 5, network adapter 520 includes a manipulated ARP table labeled "shared address resolution table" 530. The table is a manipulated ARP cache since the stored information has been reconfigured for purposes of explanation. In accordance with the present invention, multiple types of information can be extracted from the ARP cache, including IP address information, stack information, session information, ARP response information, and whether the IP address is defined as a local IP address at this network adapter (which as noted may comprise an IBM OSA adapter). Network adapter 520 couples processing system 510 to a network 540 such as a local area network (LAN). LAN 540 itself may have multiple clients coupled thereto, each with a different IP address such as shown in FIG. 5.

In accordance with the principles of the present invention, data can be gathered on any of three levels: namely, (1) a system level; (2) a partition (or stack) level; and (3) a session (user token) level. From any level, the following retrievals can be performed.

(1) Find the local registered IP addresses for a specific communications stack (e.g., TCP/IP stack). In one example, these are addresses added to the ARP cache using a SETIP command such as described in the above-incorporated United States patent entitled "Communication Method and Apparatus For Use In a Computing Network Environment Having High Performance LAN Connections," U.S. Pat. No. 6,185,218. These ARP entries are useful for an end user to ascertain the (HOME) IP addresses associated with a specific stack and the IP addresses which are registered by the stack, but which the OSA adapter will not respond to an ARP. A "HOME" IP address is deemed to be "owned" by a specific communications stack, and therefore will respond to ARPs. The second class of addresses registered by a communications stack is used in case of a network failure of another interface. The OSA adapter will route a received IP datagram containing the registered address to the registering communications stack. However, if an ARP is received for the address, the OSA card will not respond. The "owning" communications stack is assumed to respond to the address. Since network configuration information continues to become more complex, detailed information provided by the query ARP functions presented herein becomes more and more valuable. Further, in accordance with the present invention, a user can specify to have just the HOME IP addresses retrieved, or just the registered addresses to which the OSA adapter will not respond to an ARP request.

(2) Find the network address resolution (for example, ARP) entries associated with one or more HOME IP addresses for a communications stack. This feature allows a user to pull the ARP entries which were resolved to a specific HOME IP address. The information will provide the ARP table entries which have the HOME IP address specified as the "target" IP address in an ARP request (or an ARP reply). This information is useful for viewing client activity for a specific IP address. A user will be able to find the IP addresses in the network which are using the various HOME IP addresses to connect to the specific IP communications stack. The command allows a user to specify a specific HOME IP address or more than one HOME IP address.

(3) Find if another communications stack connected to the network adapter has specified an IP address as a HOME IP address, or registered an address with the network adapter, or if a particular address is owned by another entity on the network coupled to the adapter. This type of information can be useful in debugging errors in which duplicate IP addresses are detected. As customers merge systems into larger and larger networks, it becomes necessary to have the granularity to determine who an owning entity is. Because of the sharing of communications stacks across the same network interface, it is advantageous to provide a user with a technique for determining if another communications stack has registered a particular address.

(4) Find IP addresses which are in the ARP cache and which have been registered by various communications stacks connected to the network adapter, find IP addresses which have been registered by the various communications stacks have been registered as HOME IP addresses with the network adapter, and/or find IP addresses which have been registered by the various communications stacks, but to which ARP requests should not be responded to.

Note that previously, only an entire table of information has been retrievable, and that the retrieved table was specific only to a particular communications stack. In accordance with the present invention, a facility is presented that allows one communications stack to obtain information about other communications stacks and their registered IP addresses. Currently, to obtain such information the same command must be physically run on the operating system owning the specific communications stack at issue to obtain ARP information relative to that stack.

Tables 1–8 below outline one embodiment of query request and reply commands which can be employed to implement the above-summarized query ARP functions. These tables present commands for retrieving specific information and/or counter values.

Table 1 describes a common portion for a "query ARP request" command. As shown, the command includes a length of command field, a command code field which indicates a query for information or counter values, a return code field which indicates whether the network adapter can support the command, certain reserved bytes, and "command specific information". Tables 2 & 3 present examples of the command specific information which can be coupled with the Query ARP Request command of Table 1.

TABLE 1

Query ARP Request (common portion)

Length of command including this length field
Command code:

Query Information
Query Counters

TABLE 1-continued

Query ARP Request (common portion)

Return code for this command indicates success even if only one item may be
supplied
issued when command is not supported
issued when command is supported but can not provide
any information
Reserved
Command specific information The query request command of Table 1 uses a pair of defined bit masks to request either information from the ARP cache or statistical records for various numbers of masks. Each command flavor, i.e., information or counters, uses its own set of masks. Table 2 presents one embodiment of a Query ARP Request Counters command, which again would comprise the "command specific information" field for the Query ARP Request common portion of Table 1.

TABLE 2

Query ARP Request Counters

Request bit mask set by TCP/IP bit 00 - Inbound ARP requests
bit 01 - Outbound ARP request
bit 02 - Inbound ARP replies
bit 03 - Outbound ARP replies
bit 04 - unknown ARP requests
bit 05 - no response from ARP server (ATM only)
bit 06 - Inbound ATM Inverse ARP requests
bit 07 - Inbound ATM Inverse ARP replies
bit 08 - Inbound ATM ARP invalid requests
bit 09 - Inbound ATM ARP NAKs (negative acknowledgments)
bit 10 - Outbound ATM Inverse ARP requests
bit 11 - Outbound ATM Inverse ARP replies
bit 12 - Outbound ATM ARP invalid requests
bit 13 - Outbound ATM ARP NAKs
bit 14–31 - reserved
Request Type Query All ARP Cache Entries
Query Partition Data
Query Session Data
Query TCP Stack Data
Partition/Stack/Session Identifier The issuing communications stack sets on each flag that represents a statistical record (i.e., counter) or unit of information that is being requested. In Table 2, bits 00–13 of the request bit mask field are set by the communications stack depending upon the desired counter values. The request type field allows the communications stack to query all ARP cache entries, query partition data only, query session data or query TCP stack data. Further, a particular partition, stack or session identifier field is included allowing the communications stack additional granularity in the information retrieved.

Table 3 presents one embodiment of a Query ARP Request Information command in accordance with the principles of the present invention. The Query ARP Request Information command would comprise the "command specific information" field for the Query ARP Request common portion of Table 1 when specific information is being requested from the ARP cache. In the bit mask field for Table 3, the following information can be ascertained: remote IP address information; remote physical address information; physical address type; and media specific information. (Tables 7 & 8 depict embodiments of media specific information which can be ascertained.) In addition, this command includes a type field for information on all ARP cache entries, or for information on a partition basis, a session basis, or a communications stack basis. Further, a field is included which allows identification of a particular partition, stack or session on which information is to be retrieved.

TABLE 3

Query ARP Request Information

Note: following information is returned for each ARP entry
Request bit mask set by TCP/IP bit 00 - Remote IP address
bit 01 - Remote physical address
bit 02 - Physical address type*
bit 03 - Media specific information*
Note: That it is assumed that all bits will be on for all LAN types. Selective use of individual bits will not be supported until such time as a network media type requires selective use.
bit 04–15 - reserved
Request Type Query All ARP Cache Entries
Query Partition Data
Query Session Data
Query TCP Stack Data
Partition/Stack/Session Identifier Table 4 depicts one embodiment of a Query ARP Reply command (common portion) which can be used to respond to a Query ARP Request pursuant to this invention.

TABLE 4

Query ARP Reply (common portion)

Length of command including this length field
Command code:

Query Information
Query Counters
Return code for this command indicates success even if only one item may be supplied
issued when command is not supported
issued when command is supported but can not provide any information
Sequence field reply:

'nn' is the number of frame used by to satisfy the request
'xx' is the sequence number of this specific frame
Command specific information In the ARP reply common portion of Table 4, note that the reply includes the length of the command, a command code indicating whether the command is for a query of information or counter values, a return code for the command to indicate whether the information may be supplied, a sequence field reply and "command specific information". Tables 5 & 6 present the command specific information for one embodiment of a query ARP reply in accordance with the present invention.

TABLE 5

Query ARP Reply Counters

Request bit mask set by TCP/IP bit 00 - Inbound ARP requests
bit 01 - Outbound ARP request
bit 02 - Inbound ARP replies
bit 03 - Outbound ARP replies
bit 04 - Inbound unknown ARP requests
bit 05 - no response from ARP server (ATM)
bit 06 - Inbound ATM Inverse ARP requests
bit 07 - Inbound ATM Inverse ARP replies
bit 08 - Inbound ATM ARP invalid requests
bit 09 - Inbound ATM ARP NAKs
bit 10 - Outbound ATM Inverse ARP requests
bit 11 - Outbound ATM Inverse ARP replies
bit 12 - Outbound ATM ARP invalid requests
bit 13 - Outbound ATM ARP NAKs
bit 14–31 - reserved
Reply bit mask set bit 00 - Inbound ARP requests
bit 01 - Outbound ARP request
bit 02 - Inbound ARP replies
bit 03 - Outbound ARP replies
bit 04 - Inbound unknown ARP requests
bit 05 - no response from ARP server (ATM)
bit 06 - Inbound ATM Inverse ARP requests
bit 07 - Inbound ATM Inverse ARP replies
bit 08 - Inbound ATM ARP invalid requests
bit 09 - Inbound ATM ARP NAKs
bit 10 - Outbound ATM Inverse ARP requests
bit 11 - Outbound ATM Inverse ARP replies
bit 12 - Outbound ATM ARP invalid requests
bit 13 - Outbound ATM ARP NAKs
bit 14–31 - reserved
Request Type Query All ARP Cache Entries
Query Partition Data
Query Session Data
Query TCP Stack Data
Partition/Stack/Session Identifier
Inbound ARP Requests
Outbound ARP requests
Inbound ARP replies
Outbound ARP replies
Inbound unknown ARP requests
No response from server
Inbound ATM Inverse ARP requests
Inbound ATM Inverse ARP replies
Inbound ATM ARP invalid requests
Inbound ATM ARP NAKs
Outbound ATM Inverse ARP requests
Outbound ATM Inverse ARP replies
Outbound ATM ARP invalid request
Outbound ATM ARP NAKs

TABLE 6

Query ARP Reply Information

Request bit mask set by TCP/IP bit 00 - Remote IP address
bit 01 - Remote physical address
bit 02 - Physical address type
bit 03 - Media specific information
bit 04–15 - reserved
Reply bit mask set bit 00 - Remote IP address
bit 01 - Remote physical address
bit 02 - Physical address type
bit 03 - Media specific information
bit 04–15 - reserved TABLE 6-continued Query ARP Reply Information Request Type Query All ARP Cache Entries
Query Partition Data
Query Session Data
Query TCP Stack Data
Partition/Stack/Session Identifier
number of ARP entries covered in this reply
The following is repeated for each ARP entry
Media specific information:

a) TR SR
b) ATM VCI/VPI
Note: There is no media specific information for GNET.
Physical address type:

LAN MAC, length of 6 bytes
ATM address, length ot 20 bytes
IP address type:

v4 length of 4 bytes
v6 length of 16 bytes
ARP Entry Type

Home IP Address (grat ARP)
Local IP Address (no-grat ARP)
Remote Network Address
Recovery IP Address
Physical address
IP address Note that Table 5 presents the "command specific information" for a Query ARP Reply of counter values, while Table 6 presents one embodiment of a Query ARP Reply of information. In the query ARP reply, the gateway will set on only those flags for which it is able to satisfy the request. Hence, the reply contains the original request mask as well as the results of the query. In this way, if a particular piece of information is not available, it can be added at a later time without changing the command formats. The communications stack requests information as indicated by its bit mask settings. The gateway will return only those it supports. Over time, as the gateway is able to supply more of the requested information, it will be able to do so without having a dependency on TCP/IP code changes. In addition, the bit masks presented herein preferably contain reserved bits for possible future additions. Multiple primitives in a single request can be used to facilitate data transfer.

The command specific information fields of Table 5 and Table 6 also include a request type field which allows the network adapter to signal that the information being returned is for all ARP cache entries, is partition data, session data or TCP stack data, as well as a partition/stack/session identifier field. Table 6 also includes fields for the number of ARP entries covered in the reply, and for each ARP entry: media specific information; physical address type; IP address type; ARP entry type; physical address; and IP address.

Tables 7 & 8 present embodiments of media specific commands. In Table 7, a token ring (TR) and source routing (SR) environment is assumed, while in Table 8, an asynchronous transfer mode (ATM) environment is assumed. With respect to Table 8, VPI represents virtual protocol information, while VCI represents virtual connection information.

TABLE 7

Media Specific TR SR format

TR Source Route specific
Number of route designators. Valid values 1–8, i.e., one per segment number.
Routing Control Field - see TR Network Architecture tor details
Segment numbers where 'n' equals the number of route designators.

TABLE 8

Media Specific ATM format

ATM specific
Format of VPI/VCI:

UNI
NNI
VPI

When format = '01'X then VPI occupies first 8 bits, other bits set to binary zero
When format = '02'X then VPI occupies first 12 bits, other bits set to binary zero
VCI - always uses 16 bits Disclosed herein is a query ARP command which allows manipulation of a common system ARP cache or table by individual communications stacks of a multi-partitioned processing system coupled to a shared network adapter. The communications stacks employing the shared network adapter register IP addresses to the ARP cache. The same ARP cache is used for TCP/IP stacks across all partitions which are connected to the same network port. The commands presented herein essentially allow filtering of requests for specific counter or other information needed by a communications stack. With the commands presented, information can be gathered at the system level, or on a communications stack basis. Multiple types of information can be readily retrieved as outlined hereinabove. Further, an ability to reset counters and clear ARP entries on a per-communications stack basis is facilitated by the functions of the present invention. Prior to the present invention, there was no way to clear or reset entries which pertain to specific communications stacks without clearing or resetting all entries for all stacks sharing the network adapter.

The continuing desire to integrate and manage different types of systems is significant as the business world moves more into e-business solutions. With today's versions of gateways, these "extended" capabilities presented herein increase the overall robustness of the solution. The ability to dynamically monitor alterations, additions and deletions from the communications function supported by the network adapter and make necessary modifications to the system to reflect these changes is significant to merging the gateway device with the main system to act as an integrated internet/e-business environment.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for retrieving data, said method comprising:
    providing a network adapter for a computing environment having a plurality of logical partitions, each logical partition having at least one communications stack, wherein multiple communications stacks across the plurality of logical partitions transparently share the network adapter, the network adapter coupling the plurality of logical partitions to a network;
    sending a command from one communications stack of the multiple communications stacks to the shared network adapter to retrieve specific data therefrom; and
    responsive to said command, extracting the specific data from a shared address resolution table at the network adapter for return to the communications stack sending the command, wherein the shared address resolution table is shared by the plurality of logical partitions.

2. The method of claim 1, wherein the specific data comprises at least one local registered internet protocol (IP) address registered at the network adapter for the communications stack sending the command.

3. The method of claim 2, wherein the at least one local registered IP address comprises at least one HOME IP address registered at the network adapter for the communications stack sending the command.

4. The method of claim 1, wherein the specific data comprises at least one network address resolution entry in the shared address resolution table for at least one communications stack of the multiple communications stacks.

5. The method of claim 4, wherein the specific data comprises at least one network address resolution entry associated with at least one HOME internet protocol (IP) address of the at least one communications stack of the multiple communications stacks.

6. The method of claim 5, wherein said extracting comprises extracting at least one network address resolution entry from the shared address resolution table, wherein said at least one network address resolution entry has said at least one HOME IP address specified as a target IP address.

7. The method of claim 5, wherein said extracting comprises finding at least one IP address of said network which is using said at least one HOME IP address to connect to said at least one communications stack of the multiple communications stacks.

8. The method of claim 1, wherein said extracting comprises determining whether another communications stack of the multiple communications stacks has registered a particular address in the shared address resolution table, or whether the particular address is owned by another entity on said network coupled to the network adapter.

9. The method of claim 8, wherein said extracting comprises determining whether said another communications stack has registered the particular address as a HOME internet protocol (IP) address in the shared address resolution table.

10. The method of claim 1, wherein said extracting comprises extracting internet protocol (IP) addresses registered at the shared address resolution table by said multiple communications stacks, wherein said IP addresses registered at the shared address resolution table are determinable from a single communications stack issuing a single command.

11. The method of claim 10, wherein said determining comprises determining IP addresses registered by said multiple communications stacks in the shared address resolution table and which have been identified by said multiple communications stacks as HOME IP addresses, wherein a single communications stack issuing a single command can ascertain HOME IP addresses of the multiple communications stacks sharing the network adapter.

12. The method of claim 10, wherein said extracting comprises determining the IP addresses registered by said multiple communications stacks in the shared address resolution table and which are flagged for the network adapter not to respond to a request directed thereto notwithstanding registration of said IP addresses.

13. The method of claim 1, wherein said specific data comprises data associated with at least one other communications stack of the multiple communications stacks, or comprises at least one registered network address associated with said at least one other communications stack.

14. A system for retrieving data comprising:
    a network adapter for a communications environment having a plurality of logical partitions, each logical partition having at least one communications stack, wherein multiple communications stacks across the plurality of logical partitions transparently share the network adapter, the network adapter coupling the plurality of logical partitions to a network;
    means for sending a command from one communications stack of the multiple communications stacks to the shared network adapter to retrieve specific data therefrom; and
    means for extracting the specific data from the shared address resolution table at a network adapter, responsive to said command, for return to the communications stack sending the command, wherein the shared address resolution table is shared by the plurality of logical partitions.

15. The system of claim 14, wherein the specific data comprises at least one local registered internet protocol (IP) address registered at the network adapter for the communications stack sending the command.

16. The system of claim 15, wherein the at least one local registered IP address comprises at least one HOME IP address registered at the network adapter for the communications stack sending the command.

17. The system of claim 14, wherein the specific data comprises at least one network address resolution entry in the shared address resolution table for at least one communications stack of the multiple communications stacks.

18. The system of claim 17, wherein the specific data comprises at least one network address resolution entry associated with at least one HOME internet protocol (IP) address of the at least one communications stack of the multiple communications stacks.

19. The system of claim 18, wherein said means for extracting comprises means for extracting at least one network address resolution entry from the shared address resolution table, wherein said at least one network address resolution entry has said at least one HOME IP address specified as a target IP address.

20. The system of claim 18, wherein said means for extracting comprises means for finding at least one IP address of said network which is using said at least one HOME IP address to connect to said at least one communications stack of the multiple communications stacks.

21. The system of claim 14, wherein said means for extracting comprises means for determining whether another communications stack of the multiple communications stacks has registered a particular address in the shared address resolution table, or whether the particular address is owned by another entity on said network coupled to the network adapter.

22. The system of claim 21, wherein said means for extracting comprises means for determining whether said another communications stack has registered the particular address as a HOME internet protocol (IP) address in the shared address resolution table.

23. The system of claim 14, wherein said means for extracting comprises means for extracting internet protocol (IP) addresses registered at the shared address resolution table by said multiple communications stacks, wherein said IP addresses registered at the shared address resolution table are determinable from a single communications stack issuing a single command.

24. The system of claim 23, wherein said means for determining comprises means for determining IP addresses registered by said multiple communications stacks in the shared address resolution table and which have been identified by said multiple communications stacks as HOME IP addresses, wherein a single communications stack issuing a single command can ascertain HOME IP addresses of the multiple communications stacks sharing the network adapter.

25. The system of claim 23, wherein said means for extracting comprises means for determining the IP addresses registered by said multiple communications stacks in the shared address resolution table and which are flagged for the network adapter not to respond to a request directed thereto notwithstanding registration of said IP addresses.

26. The system of claim 14, wherein said specific data comprises data associated with at least one other communications stack of the multiple communications stacks, or comprises at least one registered network address associated with said at least one other communications stack.

27. A system for retrieving data comprising:
a network adapter for a communications environment having a plurality of logical partitions, each logical partition having at least one communications stack, wherein multiple communications stacks across the plurality of logical partitions transparently share the network adapter, the network adapter coupling the plurality of logical partitions to a network for facilitating data transfer between said multiple communications stacks and said network, said network adapter including an address resolution table shared by the plurality of logical partitions;
a communications stack of the multiple communications stacks being adapted to send a command to the shared network adapter to retrieve specific data therefrom; and
wherein the network adapter is adapted to extract the specific data from the shared address resolution table responsive to said command for return to the communications stack sending the command.

28. At least one program storage device readable by a machine tangibly embodying at least one program of instructions executable by the machine to perform a method of retrieving data, said method comprising:
providing a network adapter for a computing environment having a plurality of logical partitions, each logical partition having at least one communications stack, wherein multiple communications stacks across the plurality of logical partitions transparently share the network adapter, the network adapter coupling the plurality of logical partitions to a network;
sending a command from one communications stack of the multiple communications stacks to the shared network adapter to retrieve specific data therefrom; and
responsive to said command, extracting the specific data from a shared address resolution table at the network adapter for return to the communications stack sending the command, wherein the shared address resolution table is shared by the plurality of logical partitions.

29. The at least one program storage device of claim 28, wherein the specific data comprises at least one local registered internet protocol (IP) address registered at the network adapter for the communications stack sending the command.

30. The at least one program storage device of claim 29, wherein the at least one local registered IP address comprises at least one HOME IP address registered at the network adapter for the communications stack sending the command.

31. The at least one program storage device of claim 28, wherein the specific data comprises at least one network address resolution entry in the shared address resolution table for at least one communications stack of the multiple communications stacks.

32. The at least one program storage device of claim 31, wherein the specific data comprises at least one network address resolution entry associated with at least one HOME internet protocol (IP) address of the at least one communications stack of the multiple communications stacks.

33. The at least one program storage device of claim 32, wherein said extracting comprises extracting at least one network address resolution entry from the shared address resolution table, wherein said at least one network address resolution entry has said at least one HOME IP address specified as a target IP address.

34. The at least one program storage device of claim 32, wherein said extracting comprises finding at least one IP address of said network which is using said at least one HOME IP address to connect to said at least one communications stack of the multiple communications stacks.

35. The at least one program storage device of claim 28, wherein said extracting comprises determining whether another communications stack of the multiple communications stacks has registered a particular address in the shared address resolution table, or whether the particular address is owned by another entity on said network coupled to the network adapter.

36. The at least one program storage device of claim 35, wherein said extracting comprises determining whether said another communications stack has registered the particular address as a HOME internet protocol (IP) address in the shared address resolution table.

37. The at least one program storage device of claim 28, wherein said extracting comprises extracting internet protocol (IP) addresses registered at the shared address resolution table by said multiple communications stacks, wherein said IP addresses registered at the shared address resolution table are determinable from a single communications stack issuing a single command.

38. The at least one program storage device of claim 37, wherein said determining comprises determining IP addresses registered by said multiple communications stacks in the shared address resolution table and which have been identified by said multiple communications stacks as HOME IP addresses, wherein a single communications stack issuing a single command can ascertain HOME IP addresses of the multiple communications stacks sharing the network adapter.

39. The at least one program storage device of claim 37, wherein said extracting comprises determining the IP addresses registered by said multiple communications stacks in the shared address resolution table and which are flagged for the network adapter not to respond to a request directed thereto notwithstanding registration of said IP addresses.

40. The at least one program storage device of claim 28, wherein said specific data comprises data associated with at least one other communications stack of the multiple communications stacks, or comprises at least one registered network address associated with said at least one other communications stack.

* * * * *